United States Patent
Breuer et al.

(10) Patent No.: US 7,994,734 B2
(45) Date of Patent: Aug. 9, 2011

(54) CIRCUIT ARRANGEMENT FOR OPERATION OF DISCHARGE LAMPS, AND METHOD FOR OPERATION OF DISCHARGE LAMPS

(75) Inventors: Christian Breuer, Newburyport, MA (US); Martin Brückel, Garching (DE); Andreas Huber, Maisach (DE); Henning Rehn, Berlin (DE); Bernhard Reiter, München (DE)

(73) Assignee: OSRAM Gesellschaft mit Beschränkter Haftung, München (DE)

( * ) Notice: Subject to any disclaimer, the term of this patent is extended or adjusted under 35 U.S.C. 154(b) by 244 days.

(21) Appl. No.: 12/519,122

(22) PCT Filed: Dec. 13, 2006

(86) PCT No.: PCT/EP2006/069665
§ 371 (c)(1),
(2), (4) Date: Jun. 12, 2009

(87) PCT Pub. No.: WO2008/071232
PCT Pub. Date: Jun. 19, 2008

(65) Prior Publication Data
US 2010/0026211 A1 Feb. 4, 2010

(51) Int. Cl.
*G05F 1/00* (2006.01)
(52) U.S. Cl. ............... 315/291; 315/224; 315/209 R; 315/247; 315/307
(58) Field of Classification Search .............. 315/291, 315/297, 307–311, 224, 225, 247, 246, 209 R
See application file for complete search history.

(56) References Cited

U.S. PATENT DOCUMENTS

| | | | |
|---|---|---|---|
| 5,917,558 A | 6/1999 | Stanton | |
| 7,777,423 B2 * | 8/2010 | Fischer et al. | 315/224 |
| 2003/0098659 A1 | 5/2003 | Okamoto et al. | |
| 2003/0160577 A1 | 8/2003 | Noguchi | |

FOREIGN PATENT DOCUMENTS

| | | |
|---|---|---|
| EP | 1 152 645 | 11/2001 |
| EP | 1 624 733 | 2/2006 |
| WO | WO 2004/002200 | 12/2003 |
| WO | WO 2006/016335 | 2/2006 |

* cited by examiner

*Primary Examiner* — Tuyet Thi Vo
(74) *Attorney, Agent, or Firm* — Cohen Pontani Lieberman & Pavane LLP

(57) ABSTRACT

A circuit arrangement for operating a discharge lamp, wherein the circuit arrangement comprises a commutation device, which has an input which is coupled to a DC source, and has an output which can be coupled to a discharge lamp. The commutation device is designed in such a way that it couples the DC source to the output, and the polarity at which the DC source is coupled to the output can be commutated by a control device. The control device has a sync input, and the polarity of the DC source is commutated in synchronism with sync pulses of a sync signal which can be applied at the sync input. The control device has a measuring input, which is coupled to a measuring device which is designed to provide a measured value which is a measure of the size of electrode peaks. The control device suppresses at least one commutation if the measured value overshoots or undershoots a predetermined threshold value.

15 Claims, 2 Drawing Sheets

Figure 1:
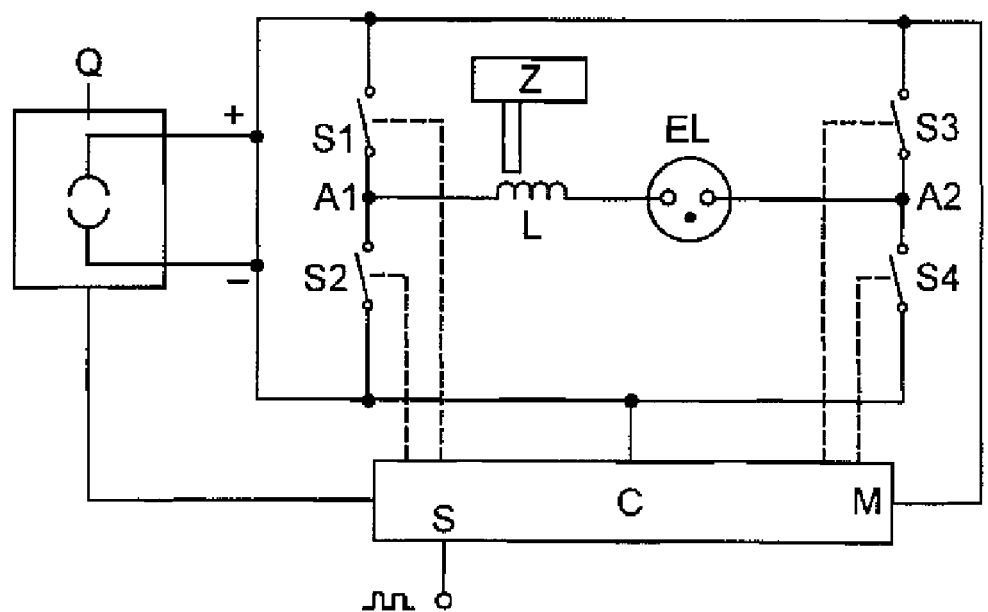

CIRCUIT ARRANGEMENT FOR OPERATION OF DISCHARGE LAMPS, AND METHOD FOR OPERATION OF DISCHARGE LAMPS

RELATED APPLICATIONS

This is a U.S. national stage of application No. PCT/EP2006/069665, filed on Dec. 13, 2006.

FIELD OF THE INVENTION

The invention relates to a circuit arrangement for operating discharge lamps, in particular high-pressure discharge lamps and ultra-high-pressure discharge lamps, as are used in image projection devices. The invention deals with the problem of flicker phenomena which are caused by the discharge lamps. In particular, the invention deals with problems which occur as a result of direct current for reducing flicker phenomena.

BACKGROUND OF THE INVENTION

During operation of discharge lamps, which will also be referred to below as lamp for short, there is the phenomenon of the growth of electrode peaks. Material which is vaporized by the electrodes at one point is again deposited at preferred points on the electrode and this results in the formation of electrode peaks. These electrode peaks initially have the advantage that the plasma arc of the arc discharge produced in the lamp finds a stable attachment point on the electrode and does not jump between a plurality of attachment points. This jumping of the discharge point is also referred to as arc jumping and is expressed in flicker of the lamp. This is particularly destructive if the light from the lamp is used for projecting images.

The attachment point of the arc is only formed on an electrode which acts as a cathode. The attachment of the arc on the anode is flat. In the case of lamps which are operated on alternating current, the arc jumping is therefore a widespread problem since, with each change in polarity, the arc needs to find an attachment point on the electrode changing from anode to cathode. The above-described electrode peaks form a preferred attachment point for the arc and thus reduce arc jumping.

However, problems can also arise as a result of the electrode peaks. Under unfavorable conditions, two or more electrode peaks may form. It may then arise that the arc attachment jumps between the different electrode peaks.

In the document EP 1 624 733 A2 (Suzuki), this problem is solved by virtue of the fact that the operating frequency, i.e. the frequency of the alternating current at which the lamp is operated, is reduced for a limited time. This method functions by virtue of the fact that an electrode is heated while it is acting as the anode and is cooled while it is acting as the cathode. This results in a temperature fluctuation with a time profile which corresponds to the operating frequency. At high frequencies, a mean temperature is set as a result of the thermal capacity of the electrodes. During so-called square-wave operation, the lamps are operated on a square-wave current with a frequency of typically from 200 to 5000 Hz. Depending on the design of the lamp, noticeable temperature modulation of the electrodes can arise even at 200 Hz. In the case of considerable temperature modulation, the electrode reaches temperatures at which the superfluous electrode peaks are fused off.

A further problem arises if the electrode peaks become too long and therefore the plasma arc between the electrodes becomes short. The shortening of the plasma arc results in a reduced running voltage of the lamp. Since the lamp is generally regulated to a constant power, the reduced running voltage results in an increased current. This is disadvantageous for the loading of component parts in the control gear for the lamp. Component parts which are involved in the provision of the lamp current need to be designed for an increased lamp current or will become subject to damage.

Video projectors often require a light source which has a temporal sequence of different colors. As is described in the document U.S. Pat. No. 5,917,558 (Stanton), this can be achieved by a rotating color wheel, which filters changing colors from the light from the lamp. The time periods during which the light assumes a specific color do not necessarily need to be the same. Instead, a desired color temperature which results for the projected light can be set via the ratio of these time periods in relation to one another.

Generally, the lamp is operated on a square-wave lamp current. The reciprocal value of the period duration of the square-wave lamp current is understood to be the abovementioned operating frequency. In the prior art, the lamp current is generated from a DC source with the aid of a commutation device. The commutation device conventionally comprises electronic switches, which commutate the polarity of the DC source in step with the square-wave lamp current. During the commutation, overshoots in practice cannot be avoided completely. Therefore, in the prior art, the time at which a commutation is intended to take place is combined with the time at which the color of the light changes in order to suppress the overshoots. For this purpose, a sync signal is provided which has a sync pulse in synchronism with the abovementioned color wheel. The color change and the commutation of the lamp current is synchronized with the aid of the sync signal.

In the prior art according to EP 1 624 733 A2 (Suzuki), the operating frequency is lowered, as explained above, for a limited time in order that additional electrode peaks are fused off. This results in the problem that the synchronization of the commutation with the sync signal is no longer ensured by the reduction in frequency. The commutation can therefore also take place at a time at which there is no color change taking place.

SUMMARY OF THE INVENTION

Experiments have shown that, during operation of a high-pressure discharge lamp for projection purposes, electrode peaks grow which cause the abovementioned problems: flicker and high lamp current. The regulated fusing-off of these electrode peaks counteracts these two problems.

One object of the present invention is to provide a circuit arrangement for operating a discharge lamp in which it is possible for electrode peaks to be fused off in regulated fashion and, at the same time, the commutation always takes place in synchronism with the color change.

Furthermore, it is an object of the present invention to provide a method corresponding to the abovementioned object. Since the invention also has a method aspect, the following description should be understood both in terms of the apparatus aspect and in terms of the method aspect.

The object is achieved by a circuit arrangement for operating a discharge lamp, which comprises a DC source, which can be coupled to a discharge lamp via a commutation device, wherein a control device suppresses at least one commutation of the commutation device if a measured value, which is a measure of the size of electrode peaks, overshoots or undershoots a predetermined threshold value. The DC source is connected at the input of the commutation device. The commutation device has an output to which a discharge lamp can be connected. The commutation device is designed in such a way that it couples the DC source to the output, and the polarity at which the DC source is coupled to the output can be commutated by a control device. This means that the lamp current through a connected discharge lamp can be commutated, i.e. its polarity can be reversed, with the aid of the commutation device. The control device is coupled to the commutation device and predetermines the direction of flow of the current through the lamp. The temporal sequence of the commutations fixes the operating frequency at which the lamp is operated.

The control device has a sync input, at which a sync signal, which contains sync pulses, is applied during operation. The control device now causes a commutation, which is in synchronism with the sync pulses. As explained above, the color change of the projected light is generally produced by a rotating color wheel. If a commutation takes place, it should then take place at the same time as a color change. However, a color change is also conceivable which takes place without commutation. In general, the sync signal is designed in such a way that it has a sync pulse per revolution of the color wheel. The sync signal therefore
generally does not contain a sync pulse for every color change. Instead, the sequence of the color changes is preferably stored in the control device. This must be matched individually to the color wheel used. In particular, the gap between the color changes on the color wheel does not need to be constant. Color wheels are also known which emit a plurality of sync pulses per revolution. The decisive function of the sync pulses consists in the fact that the control device receives information on the instantaneous position of the color wheel and therefore has information regarding the times at which color changes occur.

The synchronicity between the sync pulses and the commutation of the polarity of the DC source at the output of the commutation device is to be understood as follows: a sequence of times at which a commutation is intended to take place is stored in the control device. With each sync pulse, the control device starts a sequence of commutations corresponding to the stored times. However, the times are not fixed, but are standardized in terms of the temporal interval between two sync pulses. For a given color wheel, a commutation therefore always falls on a color change, even if the rotation speed of the color wheel changes. Suppression of commutations according to the invention does not intervene in the synchronization between the commutation and the sync pulses. All commutations which have not been suppressed temporally coincide with a color change.

The measured value mentioned above is preferably a value which is proportional to the lamp voltage. Generally, the rms value is given for the lamp voltage. During square-wave operation, this is simply the amplitude of the square wave. The lamp voltage decreases when the electrode peaks grow. A minimum value is accordingly predetermined. If this minimum value is undershot, this means that the electrode peaks are too long for safe operation. In this case, the control device suppresses at least one commutation. As a result, at least one electrode is heated and the corresponding electrode peak is fused off, whereupon the lamp voltage rises again.

Other measured values are also possible which contain information on the length of the electrode peaks. For example, the arc length can be measured visually. Since both measured values which become lower as the electrode peaks become longer and measured values for which the reverse is true are conceivable, a commutation either needs to be suppressed if a predetermined threshold value is undershot or overshot. It is critical that a commutation is suppressed if the electrode peaks become too long.

Until now it has only been established that the control device suppresses at least one commutation if the electrode peaks become too long. No mention has been made regarding how many commutations should be suppressed. The simplest stipulation for this is to maintain the suppression until the measured value overshoots or undershoots the predetermined threshold value. Overshooting naturally relates to the cases in which overshooting means excessively long electrode peaks. In the reverse case, for example in the case of the lamp voltage as the measured value, the commutation is suppressed until the threshold value is undershot. One disadvantage with this solution is the fact that the lamp is operated on direct current whose polarity is random during the suppression. Therefore only one electrode peak is fused off, which can result in a lack of symmetry of the position of the electrode in the lamp.

Advantageously, the suppression of the commutation can also take place over a predetermined DC time. Advantageously, the DC time is selected to be so short that the length of the electrode peak after the DC time has elapsed has not yet decreased to the desired value. In this case, once the DC time has elapsed, a DC time is started again in which the respective other electrode peak is fused off.

Instead of the DC time, a number N can also be predetermined which predetermines the number of commutations which is suppressed in each case by the control device. In this case, N is preferably selected such that, once N commutations have been suppressed, the respective electrode peak has not yet been fused off to the desired length. After the N commutations, a further number of N
commutations is then suppressed, at which the respective other electrode peak is then fused off.

In order to distribute the fusing-off process uniformly between the two electrodes, the suppression of a plurality of successive commutations can advantageously be interrupted by canceling of suppression. Thus, the polarity of the lamp current changes and the respective other electrode peak is fused off. The number of cancelled suppressions should naturally not be so great that no fusing-off of the electrode peaks takes place any more.

In the case of electrodes which have a low thermal inertia, even the suppression of two successive commutations can result in overheating of the electrode. In this case, it is advantageous to only suppress every m-th commutation. Very precise control of the fusing-off process can thus be performed.

The suppression of successive commutations results in fusing-off only of that electrode which is the anode at that time. Such a sequence of suppressed commutations can be referred to as DC phase since a DC current flows through the lamp at the time at which the commutations are suppressed. It is advantageous that, in the case of successive DC phases, the electrodes alternately form the anode. The electrodes are thus fused off uniformly. This alternating DC phase as regards the electrodes is realized with the aid of a memory device, which makes it possible to establish which electrode was the anode in the last DC phase. The following DC phase starts when precisely the other electrode is the anode. A DC phase can of course also only comprise a suppressed commutation.

It is conventional to implement the commutation device with a full bridge comprising 4 electronic switches. The full bridge is fed by the DC source, and the lamp is in a bridge branch.

Diagonally positioned switches are switched at the same time. Thus, the DC source is coupled to the lamp with alternating polarity. A commutation comprises switching-off of switches lying in one diagonal and switching-on of switches lying in the other diagonal. Two switches positioned next to one another are coupled to the negative terminal of the DC source. The other two switches are coupled to the positive terminal. The negative terminal is generally the reference potential of the circuit arrangement. The switches coupled to the negative terminal can therefore usually be driven without any problems. The switches coupled to the positive terminal are referred to as high-side switches and can only be driven with difficulty, as is known. A charge pump is required for driving the high-side switches. This charge pump is supplied with energy only during a commutation.

If now, as is proposed by the present invention, commutations are suppressed, it may arise that the driving of the high-side switches is no longer ensured. Advantageously, the control device in this case does not suppress the commutation, but produces two commutations in quick succession. As a result of these commutations in quick succession, the charge pump again receives energy and the driving of the high-side switches is ensured. The two commutations need to be in such quick succession that the thermal inertia of the electrode peaks suppresses a temperature fluctuation as a result of the two commutations. Experiments have shown that, in the case of a time interval of less than 30 microseconds, the temperature of the electrode peaks remains virtually constant.

BRIEF DESCRIPTION OF THE DRAWING(S)

Figure 2:
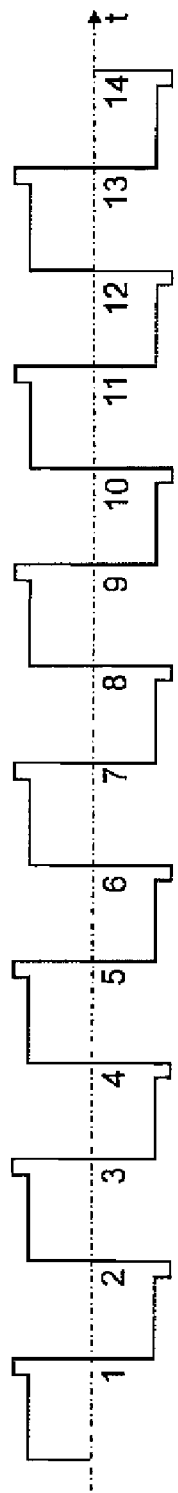
Figure 3:
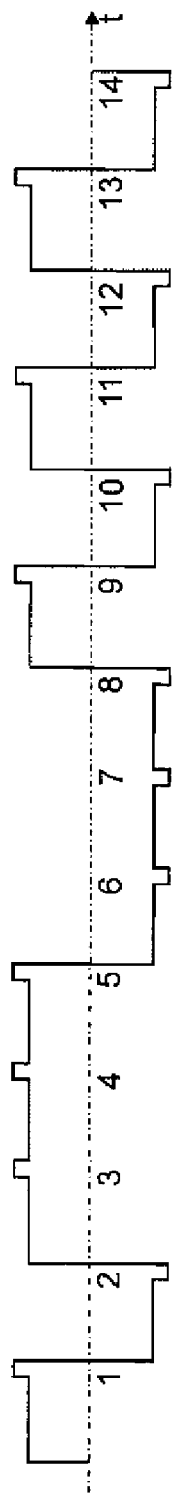
Figure 4:
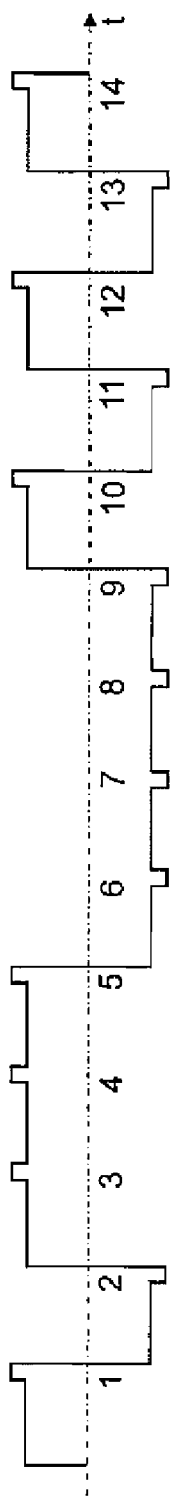

The invention will be explained in more detail below with reference to exemplary embodiments. In the drawings:

FIG. 1 shows a circuit arrangement for operating a high-pressure discharge lamp, FIG. 2 shows the time profile of the lamp current without suppression of commutations, FIG. 3 shows the time profile of the lamp current with symmetrical suppression of commutations, FIG. 4 shows the time profile of the lamp current with unsymmetrical suppression of commutations.

PREFERRED EMBODIMENT OF THE INVENTION

FIG. 1 shows a circuit arrangement for operating a high-pressure discharge lamp, as is known in terms of its topology from the prior art. The electronic switches S1, S2, S3 and S4 are connected in a full-bridge circuit between the positive terminal and the negative terminal of a DC source Q. The DC source Q generally comprises a step-down converter (Buck converter), which draws its energy from a system voltage, for example. The lamp EL is connected in the bridge branch which is positioned between the nodes A1 and A2. A winding L of a starting transformer is connected in series with the lamp EL, and a voltage which is used for starting the lamp is injected into the winding L by a starting device Z.

The full-bridge circuit forms the commutation device. An upper and a lower potential of the full-bridge circuit, which are connected to the positive terminal and the negative terminal of the DC source Q, form the input of the commutation device. The bridge branch between the nodes A1 and A2 forms the output of the commutation device.

If the switches S1 and S4 are closed, a lamp current flows from node A1 to node A2. After a commutation, the switches S3 and S2 are closed and a lamp current flows from node A2 to node A1. A square-wave current is thus generated in the lamp EL.

The switches are controlled by the control device C. The drive lines of the control device C to the switches are indicated by dashed lines. The high-side switches S1 and S3 require a charge pump, which can also be contained in the control device C and is not illustrated, for driving purposes.

The input voltage of the full bridge, which corresponds to the lamp voltage, is supplied to the control device via a measurement input M. If the lamp voltage undershoots a predetermined threshold value, the control device C suppresses at least one commutation.

A sync signal, which is provided by the drive of a rotating color wheel (not illustrated), is present at a sync input S. A connection between the control device C and the DC source Q indicates that the control device C can also be used to regulate the lamp current.

In practice, it is conventional to implement the control device with the aid of a microcontroller. The measurement input and the sync input lead to an analog and digital input, respectively, of the microcontroller. The microcontroller controls the electronic switches, which are generally MOSFETs, via known driver circuits. The majority of the invention is implemented using the software of the microcontroller.

FIG. 2 illustrates the time profile of the lamp current without a suppression of the commutation. The commutations are numbered by the numerals 1 to 14. Immediately prior to the commutation, the lamp current is increased in pulses. This is a measure for reducing flicker phenomena, as is described, for example, in the document WO 95/35645. This measure is independent of the suppression of commutations in accordance with the present invention. The frequency of the square-wave profile of the current is generally between 200 Hz and 5 kHz.

FIG. 3 shows that the commutations 3, 4, and 6, 7 have been suppressed by the control device C. The control device C has cancelled the suppression for the commutation 5. Thus, the electrode peaks of the two electrodes are fused-off symmetrically.

In FIG. 4, the commutation 8 is also suppressed in comparison with FIG. 3. Thus, the electrode peaks of the two electrodes are fused-off unsymmetrically. The electrode peak which forms the anode during the suppressed commutations 6, 7 and 8 is fused-off to a greater extent. Thus, asymmetries between the electrodes can be compensated for. That electrode peak which contributes more to flicker phenomena can therefore also be fused-off to a greater extent in a targeted manner.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for operating a discharge lamp,
    wherein the circuit arrangement comprises a commutation device, which has an input which is coupled to a DC source, and has an output which is coupled to a discharge lamp,
    wherein the commutation device is designed in such a way that it couples the DC source to the output, and the polarity at which the DC source coupled to the output is commutated by a control device,
    wherein the control device has a sync input, and the polarity of the DC source is commutated in synchronism with sync pulses of a sync signal which is applied at the sync input, wherein the control device has a measuring input, which is coupled to a measuring device which is designed to provide a measured value which is a measure of the size of electrode peaks, and wherein the control device suppresses at least one commutation if the measured value overshoots or undershoots a predetermined threshold value.

2. The circuit arrangement as claimed in claim 1, wherein the measured value is a value which is proportional to a lamp voltage of a discharge lamp, and the control device suppresses at least one commutation if the measured value undershoots a predetermined threshold value.

3. The circuit arrangement as claimed in claim 1, wherein the control device suppresses a commutation as long as the measured value overshoots or undershoots the predetermined threshold value.

4. The circuit arrangement as claimed in claim 1 wherein the control device suppresses a commutation during a predetermined DC time as soon as the measured value passes through the predetermined threshold value.

5. The circuit arrangement as claimed in claim 1, wherein the control device suppresses a predetermined number N of commutations as soon as the measured value passes through the predetermined threshold value.

6. The circuit arrangement as claimed in claim 1, wherein the discharge lamp is an ultra-high-pressure discharge lamp.

7. A projection device with a circuit arrangement as claimed in claim 1, comprising a color wheel, which is arranged and designed in such a way that it converts a white light emerging from the discharge lamp into a temporal sequence of light with at least three different colors, the time of the sync pulses being selected in such a way that it occurs in synchronism with the revolution of the color wheel.

8. The circuit arrangement as claimed in claim 1, wherein the control device cancels the suppression of the commutation for every n-th commutation, where n is a natural number greater than 2.

9. The circuit arrangement as claimed in claim 1, wherein the control device suppresses every m-th commutation as soon as the measured value passes through the predetermined threshold value, where m is a predetermined natural number.

10. The circuit arrangement as claimed in claim 1, wherein the control device comprises a memory device which stores which electrode is the anode in a sequence of suppressed commutations and causes the subsequent sequence of suppressed commutations to start when precisely the other electrode is the anode.

11. The circuit arrangement as claimed in claim 1, wherein the control device, instead of suppressing a commutation, causes two commutations which are temporally spaced apart from one another by a maximum of 30 microseconds.

12. The circuit arrangement as claimed in claim 1, wherein the control device comprises a microcontroller, the functions of the control device being fixed by a software program in a microcontroller.

13. A computer program product, comprising the software program as claimed in claim 12.

14. A method for operating a discharge lamp having comprising the steps of:
  providing a measuring device which is designed to produce a measured value which is a measure of the size of electrode peaks,
  coupling a discharge lamp to a DC source via a commutation device,
  commutating the polarity of the DC source with the aid of the commutation device in synchronism with the sync pulses of a sync signal,
  comparing the measured value with a threshold value, and
  suppressing the commutation of the polarity of the DC source for the case in which the measured value has passed through the threshold value.

15. A software program, for controlling a circuit arrangement in such a way that the method as claimed in claim 14 is executed.

* * * * *